Feb. 16, 1932.                J. M. NICKELSEN                1,845,095
                       CONNECTER FOR SHOCK ABSORBERS
                            Filed June 24, 1929
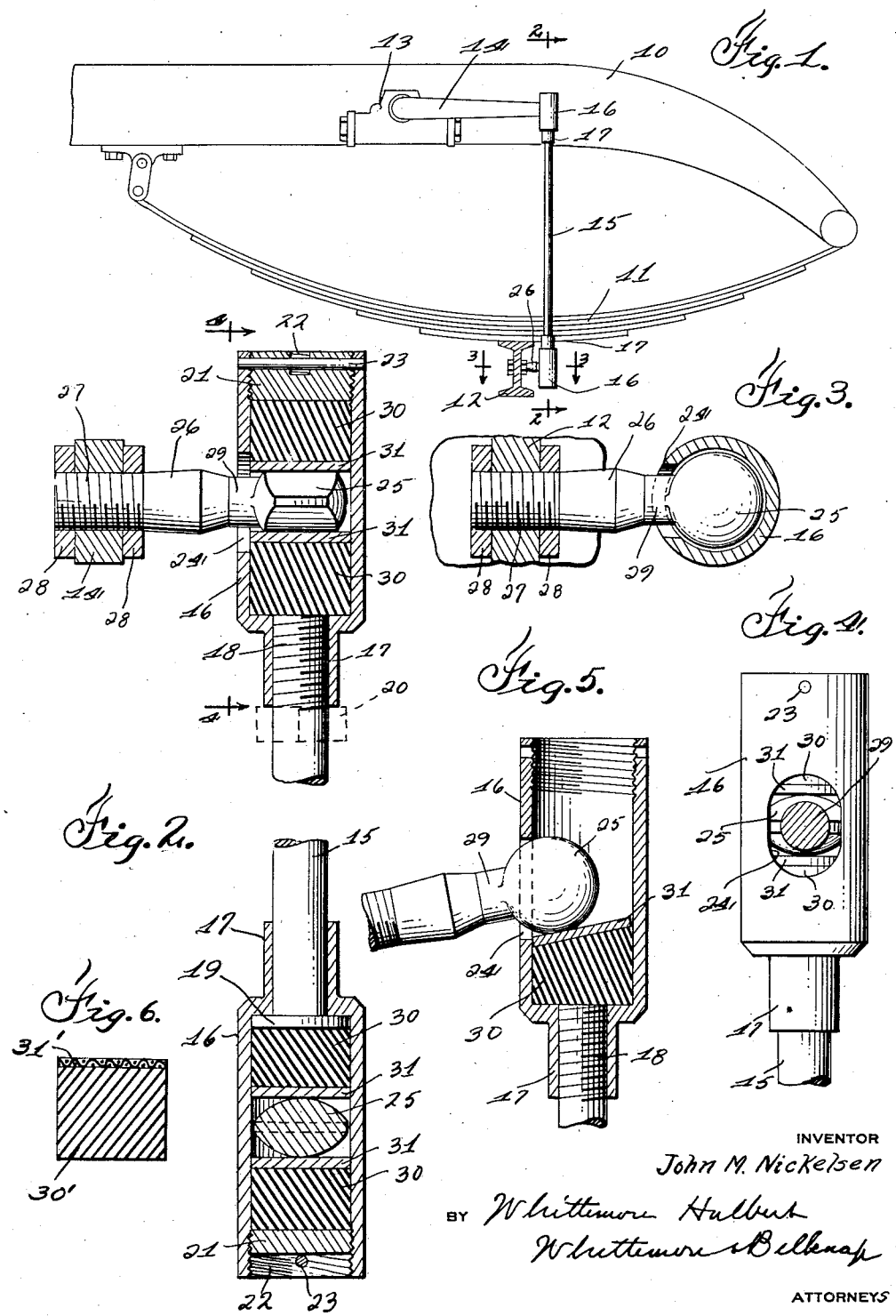
INVENTOR
John M. Nickelsen
BY Whittemore Hulbert
   Whittemore Belknap
                                                    ATTORNEYS Patented Feb. 16, 1932

1,845,095

UNITED STATES PATENT OFFICE

JOHN M. NICKELSEN, OF ANN ARBOR, MICHIGAN, ASSIGNOR TO MONROE AUTO EQUIPMENT COMPANY, OF MONROE, MICHIGAN, A CORPORATION OF MICHIGAN

CONNECTER FOR SHOCK ABSORBERS

Application filed June 24, 1929. Serial No. 373,260.

This invention relates to connecters for shock absorbers, and more particularly to improvements therein tending to simplify, render more efficient and improve the same generally.

The invention relates particularly to a connecting rod adapted to connect a shock absorber part, such for instance, as the exterior arm or load transmitting member, to a vehicle part, such for instance as the vehicle axle.

The objects of the invention are to provide a connecting rod of this character which will permit of a limited, yieldable, universal movement at the points of articulation and which is simple in design, economical to manufacture and which may be assembled and disassembled with facility.

The several objects, advantages and novel details of construction of this invention will be made more apparent as this description proceeds, especially when considered in connection with the accompanying drawings, wherein:

Figure 1 is a fragmentary side elevational view of a portion of a motor vehicle, showing the application of my invention.

Figure 2 is an enlarged longitudinal sectional view taken substantially on the plane indicated by line 2—2 in Figure 1.

Figure 3 is an enlarged horizontal sectional view taken substantially on the plane indicated by line 3—3 in Figure 1.

Figure 4 is a fragmentary sectional elevational view taken substantially on the plane indicated by line 4—4 in Figure 2.

Figure 5 is a fragmentary sectional view illustrating the manner of assembling the companion joint parts; and Figure 6 is a fragmentary sectional view through a slightly modified form of one of the compressible blocks employed in the connecter.

Referring now more particularly to the drawings wherein like reference characters indicate like parts, it will be noted that there is illustrated fragmentarily the frame member 10 of a motor vehicle and the spring 11 and axle 12 thereof. The reference character 13 indicates a shock absorbing instrumentality adapted to absorb relative movement between the frame 10 and axle 12, this instrumentality being provided with an exterior arm or load transmitting member 14.

The connecter forming the particular subject matter of this invention comprises a rod 15 having connected thereto at its ends substantially tubular thimble members providing housings 16. Each thimble or housing member 16 is provided at one of its ends with a reduced flanged portion 17 by means of which attachment is made with the rod 15. Both ends of the rod 15 may be threaded as indicated at 18, whereby the rod and thimble or housing members are adjustably connected or both ends may be headed as indicated at 19. The latter means of connecting may be used to advantage where the distance between the two centers or points of articulation can be readily and definitely determined. In many instances, however, it is preferable to head one end of the rod and thread the other, as suggested in Figure 2, so that the connecter may be readily adjusted to the proper length. Under such conditions, it is usually preferable to provide a lock nut 20, threaded on rod 15 to prevent relative rotation between the adjustable housing 16 and the rod 15.

Each of the housings 16 is, as illustrated, substantially tubular in shape and is provided with an open end which may be closed by means of a closure or plug 21 threaded therein. The plug is slotted at 22 to facilitate its rotation and both the plug and housing may be provided with aligned apertures to receive a locking or cotter pin 23.

Each housing 16 is provided with an aperture or opening 24 axially elongated in the direction of the longitudinal axis of the housing. This aperture is for the purpose of permitting the insertion or introduction of the head 25 of the companion short connecter 26. These short connecters are in the form of studlike members, one of which is secured to the arm 14 and one to the axle 12. As shown in Figures 2 and 3, the method of connecting the short connecters 26 to both the arm 14 and axle 12 may and preferably is substantially the same, that is, the connecter 26 has a threaded portion 27 extending through an aperture in either the arm 14 or axle 12, the threaded portion receiving nuts 28 which rigidly secure the connecter to the arm or axle. While this illustrated simple method of securing the short connecters to the shock absorber arm and vehicle axle has been described herein, attachment may be made in any preferred manner, it being essential only that these short connecters are rigidly secured to the said parts to be connected.

The head 25 is in the form of a substantially flat ball which terminates in a reduced neck portion 29 at the point of connection with the body portion of the connecter. The relative diameter of the neck 29 and the width of the slot or aperture 24 is such that clearance is provided on both sides of the neck, permitting oscillation of the short connecter in the longitudinal plane thereof. After insertion of the headed member 26 into the housing 16 the member 26 is rotated through an angle of 90° to position the head thereof transversely of the aperture 24 so that a withdrawal of the headed member is prevented.

Arranged in each housing 16 is a pair of blocks of compressible material 30, these blocks being arranged on opposite sides of the head 25 of the headed member and being opposed to the substantially flat sides thereof. In order to reduce the friction between the head 25 and the compressible blocks 30, which latter are preferably formed of rubber or rubber composition, bearing members or plates 31 may be interposed between the blocks 30 and the head 25.

In this connection attention is directed to Figure 6 wherein a modified form of block 30′ is shown, one surface thereof being provided with a layer or sheet of material, such as canvas 31′. This layer or sheet of canvas is preferably, although not necessarily, integrated with the block 30′ by vulcanization. This canvas member provides a bearing surface for the head which acts to reduce the friction between the parts.

It should be understood however that the blocks of compressible material 30 may be used without the bearing plates 31 or the layers of canvas 31′.

It will be noted that the compressible blocks 30 act to locate or maintain the head of the headed member in a position substantially intermediate the length of the housing and by reason of the compressibility of these blocks, a relative angular movement between the companion parts of the joint is permitted. The permitted movement is substantially universal to thus accommodate the connecter to all types of installations and permit the required movement between the connecter and the arm 14 on the one hand and the connecter and the axle 12 on the other.

One convenient and practical method of assembling the parts of the herein described connecter can best be understood by reference to Figures 4 and 5. In Figure 5 it will be noted that the lower block of compressible material 30 is first inserted and positioned in the lower portion of the housing 16 and when a bearing member or plate 31 is employed, this is also placed in position. The height of the block 30 and the position of the aperture 24 in the housing is such that the block 30 and bearing plate 31 extend upwardly beyond the lower edge of the elongated aperture 24, as most clearly illustrated in Figure 4. The headed member 26 is positioned so that the head 25 thereof can be inserted through the aperture 24, and by reason of the compressibility of the block 30, this portion is distorted somewhat in the manner suggested in Figure 5, so as to permit the head 25 to be forced through the aperture 24 and inserted into the housing 16. The headed member 26 is then rotated through an angle of 90° to position the flat head 25 transversely of the housing, as shown most clearly in Figures 3 and 4. In this position the head extends transversely of the aperture 24 and withdrawal of the headed member is prevented. Subsequently the upper bearing plate 31 and the upper compressible block 30 are inserted in the housing from the upper open end thereof, and thereupon this open end is closed by the plug 21. By screwing this plug into position the compressible blocks 30 are slightly compressed to thus bear against the opposed sides of the head 25.

The resulting construction is simple, durable and economical to produce and assemble, and is not only free from rattles and otherwise noiseless, but it is in other ways efficient and satisfactory in use. The resiliency of the blocks 30 acts to compensate for wear to the parts and prevents the joints from becoming loose, which would cause objectionable rattle. Moreover, the resiliency of the blocks permits the necessary and desirable relative angular or substantially universal movement between the companion parts of the joints. By housing and supporting the rubber blocks in the thimble members or housing 16, these blocks have very little change in form due to the action of the shock absorber. Consequently they give the desired cushioning action together with long life.

While an illustrated embodiment of the invention has been described herein somewhat in detail, it will be readily apparent to those skilled in this art that various changes and modifications may be made in many of the non-essential details without departing from the spirit and scope of this invention, and to this end reservation is made to make such changes as may come within the purview of the accompanying claims.

What I claim as my invention is:

1. In a connecter for shock absorbers, a rod, a tubular member constituting a housing secured to one end of said rod and provided at a point intermediate its ends with an axially elongated aperture, an attaching member having an enlarged substantially oval shaped head insertable into said housing through said aperture and arranged transversely of the aperture and in overlapping relation to the side edges thereof, blocks of compressible material within said housing at opposite sides of said head, and bearing members interposed between said blocks and head, said bearing members having flat surfaces engaging said oval shaped head to provide a limited contact therebetween.

2. In a connecting rod for shock absorbers, a rod, a tubular member constituting a housing secured to one end of said rod and provided intermediate its ends with an axially elongated slot, an attaching member having a shank portion extending through said slot and a substantially flat oval shaped head positioned in said tubular member transversely of said slot and in overlapping relation with its side edges to prevent withdrawal of the head therethrough, the width of said head being less than the length of said slot whereby upon a predetermined relative rotation of said headed and tubular members said head may be withdrawn or inserted through said slot, blocks of compressible material in said housing upon opposite sides of said head, flat members arranged between said blocks and head constituting substantially line bearing surfaces for the latter, and an adjustable plug in the end of said tubular member adapted to compress said blocks against said head.

In testimony whereof I affix my signature.

JOHN M. NICKELSEN.